United States Patent
Wang et al.

(10) Patent No.: US 10,976,456 B2
(45) Date of Patent: Apr. 13, 2021

(54) ACOUSTIC SENSOR FOR ROCK CRACK DETECTION

(71) Applicant: Research Institute of Petroleum Exploration & Development, PetroChina Company Limited, Beijing (CN)

(72) Inventors: Tongshan Wang, Beijing (CN); Tong Lin, Beijing (CN); Dewen Zheng, Beijing (CN); Zhide Wu, Beijing (CN); Jianfeng Liu, Beijing (CN)

(73) Assignee: RESEARCH INSTITUTE OF PETROLEUM EXPLORATION & DEVELOPMENT, PETROCHINA COMPANY LIMITED, Beijing (CN)

(*) Notice: Subject to any disclaimer, the term of this patent is extended or adjusted under 35 U.S.C. 154(b) by 473 days.

(21) Appl. No.: 16/016,749

(22) Filed: Jun. 25, 2018

(65) Prior Publication Data

US 2018/0372894 A1  Dec. 27, 2018

(30) Foreign Application Priority Data

Jun. 23, 2017 (CN) .......................... 201710488756.9

(51) Int. Cl.
*G01V 1/16* (2006.01)
*G01V 1/18* (2006.01)

(52) U.S. Cl.
CPC .............. *G01V 1/166* (2013.01); *G01V 1/181* (2013.01); *G01V 2210/1429* (2013.01)

(58) Field of Classification Search
CPC . G01V 1/166; G01V 1/181; G01V 2210/1429
See application file for complete search history.

(56) References Cited

U.S. PATENT DOCUMENTS 10,520,617 B2 * 12/2019 Farrelly ................. G01V 1/166
2015/0176344 A1 * 6/2015 McLoughlin ....... E21B 17/1078
175/24

* cited by examiner

*Primary Examiner* — Ian J Lobo
(74) *Attorney, Agent, or Firm* — Bayramoglu Law Offices LLC (57) ABSTRACT

The present invention discloses an acoustic sensor for rock crack detection including an acoustic emission probe, a probe installation mechanism and a transmission mechanism which transmits a combination of the probe installation mechanism and the acoustic emission probe to a setting position inside a borehole in the monitored rock mass. The acoustic emission probe installation mechanism essentially includes a sleeve component, a guide component, an end cap and springs. The guide component is in pluggable connection with the sleeve component or the end cap. The assembled probe installation mechanism locks the acoustic emission probe in a probe sleeve of the sleeve component. The springs inside the elastic sleeve of the sleeve component are in a compressed state.

12 Claims, 8 Drawing Sheets

ACOUSTIC SENSOR FOR ROCK CRACK DETECTION

CROSS REFERENCE TO RELATED APPLICATIONS

This application is based upon and claims priority to Chinese Patent Application NO. 201710488756.9, field on Jun. 23, 2017, the entire content of which is incorporated herein by reference.

TECHNICAL FIELD

The present invention relates to the technical field of rock (rock mass) engineering safety monitoring in engineering construction, and to an acoustic sensor for rock crack detection.

BACKGROUND

The deformation and destruction of rocks (rock mass) in engineering construction, especially a rock crack dynamic disaster, may directly endanger the construction safety, and even cause disastrous effects. Therefore, effective monitoring and prediction of the rock (rock mass) stability and the rock crack dynamic disaster are important parameters of construction safety. Currently, acoustic emission, as an important means of nondestructive monitoring, is used to monitor and predict the rock (rock mass) stability and the rock crack dynamic disaster in engineering construction.

In the process of surrounding rock excavation and construction of underground engineering, in order to accurately predict the possible deformation and damage of surrounding rock and the dynamic disaster, an acoustic emission sensor needs to be arranged in the monitored surrounding rock area in the form of three-dimensional spatial distribution in advance before the engineering excavation. Moreover, the more are the sensors arranged, the more accurate will be the monitoring results.

In the specific embodiments, it is necessary to drill a hole in the rock (rock mass) by drilling rig before the rock (rock mass) is excavated. The drilling depth increases with the increase of the buried depth of the engineering and the monitored range. However, the deeper the borehole is, the more difficult is the installation of the acoustic emission sensor. Currently, the installation methods of the acoustic emission sensor mainly include the following types.

(1) On the engineering site, the acoustic emission probe is directly placed in the borehole, and the acoustic emission probe transmits the received detection signal to the ground monitoring system through a cable by relying on the residual liquid medium (such as water) in the borehole as the medium for signal transmission between the rock mass and the acoustic emission probe. However, this method has the following disadvantages: ① This method is only suitable for downward borehole, but it is not suitable for perfectly horizontal or upward borehole with a certain angle, because of the difficulty to store the media. Even for downward borehole, the rock mass around the borehole needs to be relatively intact, thus avoiding the loss or seepage of transmission medium from the crack of the borehole and ensuring that the acoustic emission probe is always in the transmission medium. But practically it is difficult to meet this requirement at the site, thus affecting the monitoring effect; ② Although the liquid between the rock mass and the acoustic emission probe can be used as the coupling medium for signal transmission, the density of the liquid is generally relatively low, and the effect of signal transmission is not as good as that of the detection signal received by directly contacting the acoustic emission probe with the rock wall effectively.

(2) Another way is to use simple fixed installation device to fix the acoustic emission probe inside the device, then the fixed device is sent to the installation position by rigid non-movable metal transmission rod, the acoustic emission probe is pushed out by pressure and then is in contact with the rock wall of the borehole to realize fixation. This method has the following disadvantages: ① Because the distance between the fixed installation device and the wall of the borehole is very short, the fixed installation device and the borehole need to be substantially concentric structures, and the wall of the borehole is required to be smooth, but these requirements cannot be guaranteed in actual construction; ② As the fixed installation device is large in size, it is only suitable for boreholes with larger diameters, which leads to the increase of drilling cost; ③ the whole transmission rod and installation device are rigidly inserted into the borehole by force, which not only leads to great friction, easily damaging the cable or the acoustic emission probe, but also the installation device easily gets stuck into the borehole, failing to reach the installation position; ④ Because the fixed installation device is rigidly inserted into the borehole by external force, the installation process is time-consuming and laborious, and the working efficiency is extremely low; ⑤ As the wall of the borehole is cylindrical and the end face of the acoustic emission probe is planar, how to ensure the effective coupling between the end face of the acoustic emission probe and the wall of the borehole is a difficulty to be solved in practical application.

Based on the defects and disadvantages in the above-mentioned various embodiments, the acoustic emission detection has been limited in applications and promotion of monitoring of the rock (rock mass) stability and the rock crack dynamic disaster.

Therefore, to conveniently and effectively install the acoustic emission probe inside the borehole and make the installed acoustic emission probe effectively coupled with the wall of the borehole are still difficulties in on-site monitoring and research and lack relevant test methods and technical support.

SUMMARY

The objective of the present invention is to provide an acoustic sensor for rock crack detection in view of the disadvantages of the prior art. The acoustic sensor is not only convenient to install, but also easy to realize effective coupling between the acoustic emission probe and the wall of the borehole so as to ensure the effectiveness of detection signal of the acoustic emission probe.

The acoustic sensor for rock crack detection of the present invention includes an acoustic emission probe, a probe installation mechanism and a transmission mechanism for transmitting a combination of the probe installation mechanism and the acoustic emission probe to a setting position inside a borehole in the monitored rock mass. The number of the acoustic emission probes is at least one, and the number of the probe installation mechanisms is equal to the number of the acoustic emission probes. The probe installation mechanism includes a sleeve component, a guide component, an end cap, springs, a limiting pin and a connection component. The sleeve component includes a probe sleeve and spring sleeves. The probe sleeve is a cylinder with a closed lower end and an open upper end. An inner hole of the probe sleeve is in clearance fit with the acoustic emission probe. A lower end face of the probe sleeve is an arc face matched with a radian of the borehole of the monitored rock mass, and the upper end of the wall of the probe sleeve is provided with one or two notches for the cable connector of the acoustic emission probe to protrude. If there are two notches, the two notches are axial symmetrically distributed with respect to a center line of the probe sleeve. The spring sleeves are cylinders with closed lower ends and open upper ends. The number of spring sleeves is two, and the two spring sleeves are axial symmetrically fixed on the outer wall of the probe sleeve with respect to the center line of the probe sleeve. A line between projections of center lines of the two spring sleeves in a horizontal plane is perpendicular to projections of center lines of the notches on the horizontal plane. The end cap is a plate-like body matched with the shape and size of the upper end face of the probe sleeve, or the end cap includes a cover plate and a connection piece arranged on the top face of the cover plate. The cover plate is matched with the shape and size of the upper end face of the probe sleeve, and the connection piece is provided with a via hole for the limiting pin to pass through. The guide component includes a support plate and two guide rods with shaft shoulders on the upper sections thereof. if the end cap is a plate-like body, the support plate has a structure with an arc top face matched with the radian of the borehole of the monitored rock mass and a planar bottom face. The upper sections of the shaft shoulders on the two guide rods are provided with second pin holes, and the upper ends of the two spring sleeves are provided with first pin holes. If the end cap includes a cover plate and a connection piece arranged on the top face of the cover plate, the support plate has a structure with an arc top face matched with the radian of the borehole of the monitored rock mass and a planar bottom face, and the central part of the support plate is provided with a center hole matched with the shape and size of the connection piece of the end cap, the wall of the center hole is provided with a third pin hole, and the upper sections of the shaft shoulders of the two guide rods and the upper ends of the two spring sleeves are not provided with pin holes any more. The two guide rods are axial symmetrically fixed on the bottom face of the support plate with respect to a center line of the support plate, and the spacing between the center lines of the two guide rods is equal to the spacing between the center lines of the two spring sleeves. Two sets of the connection components are included, which are symmetrically installed on the outer wall of the probe sleeve with respect to a center line of the probe sleeve. Projections of center lines of the two sets of connection components in a horizontal plane are perpendicular to a line between projections of center lines of the two spring sleeves on the horizontal plane. The acoustic emission probe is installed inside the probe sleeve, and the cable connector protrudes from the notch arranged on a wall of the probe sleeve. The number of springs is two, the two springs are respectively arranged in the two spring sleeves. The lower end of each of the two springs is in contact with the bottom wall of each spring sleeve. If the end cap is a plate-like body, the end cap covers the upper end face of the probe sleeve and is detachably connected to the probe sleeve. The two guide rods of the guide component are combined with the two springs, respectively. Lower annular surface of each shaft shoulder of the guide rod is respectively in contact with the upper end of each of the two springs. The number of limiting pins is two. The two limiting pins are respectively connected to ropes and respectively inserted into the first pin holes arranged on the two spring sleeves and the second pin holes arranged on the two guide rods to connect the spring sleeves with the guide rods so as to make the two springs in a compressed state. If the end cap includes a cover plate and a connection piece arranged on the top face of the cover plate, the cover plate of the end cap covers the upper end face of the probe sleeve and is detachably connected to the probe sleeve, the support plate of the guide component is sleeved on the connection piece of the end cap, and the bottom face of the support plate is in contact with the cover plate of the end cap. The number of limiting pins is one. The limiting pin is connected to a rope and inserted into the third pin hole arranged on the support plate and the via hole arranged on the connection piece of the end cap to connect the support plate with the end cap so as to make the two springs in a compressed state. The transmission mechanisms are connected to the connection components installed on the probe sleeve.

The above-mentioned acoustic sensor for rock crack detection can realize the pluggable connection between the sleeve component and the guide component in a plurality of ways, and the specific implementation ways adopted by the present invention include the following two types: (1) The end cap is a plate-like body matched with the shape and size of the upper end face of the probe sleeve, the support plate of the guide component has a structure with an arc top face matched with the radian of the borehole of the monitored rock mass and a planar bottom face. The upper sections of the shaft shoulders on the two guide rods are provided with second pin holes, and the upper ends of the two spring sleeves are provided with first pin holes. The end cap covers the upper end face of the probe sleeve and is detachably connected to the probe sleeve. The two guide rods of the guide component are combined with the two springs, respectively. The lower annular surfaces of the shaft shoulders of the guide rods are in contact with the upper ends of the two springs, respectively. The two limiting pins are respectively inserted into the first pin holes arranged on the two spring sleeves and the second pin holes arranged on the two guide rods to connect the spring sleeves with the guide rods so as to make the two springs in a compressed state. (2) The end cap includes a cover plate and a connection piece arranged on the top face of the cover plate. The support plate has a structure with an arc top face matched with the radian of the borehole of the monitored rock mass and a planar bottom face, and the central part of the support plate is provided with a center hole matched with the shape and size of the connection piece of the end cap, the wall of the center hole is provided with a third pin hole, and the upper sections of the shaft shoulders on the two guide rods and the upper ends of the two spring sleeves are not provided with pin holes any more. The two guide rods are axially symmetrically fixed on the bottom face of the support plate with respect to a center line of the support plate, and the spacing between the center lines of the two guide rods is equal to the spacing between the center lines of the two spring sleeves. Cover plate of the end cap covers the upper end face of the probe sleeve and is detachably connected to the probe sleeve. The support plate of the guide component is sleeved on the connection piece of the end cap. The bottom face of the support plate is in contact with the cover plate of the end cap. The limiting pins are inserted into the third pin hole arranged on the support plate and the via hole arranged on the connection piece of the end cap to connect the support plate with the end cap so as to make the two springs in a compressed state.

According to the above-mentioned acoustic sensor for rock crack detection, the first pin hole on each spring sleeve is positioned above the shaft shoulder, so that the effect caused by springs floating in the process of docking the spring sleeves to the guide rods can be avoided.

According to the above-mentioned acoustic sensor for rock crack detection, in order to ensure the effective contact between the probe installation mechanism and the wall of the borehole and thus ensure the signal transmission effect of the acoustic emission probe, both the probe sleeve and the support plate have cylindrical structures.

According to the above-mentioned acoustic sensor for rock crack detection, each connection component includes a nut and at least two pairs of connection brackets. One end of each connection bracket is uniformly distributed around the outer wall of the nut and hinged with the outer wall of the nut, and the other end of each connection bracket is fixedly connected to the outer wall of the probe sleeve. The connection components can make the installation mechanism realize small rotation within a certain range, thus further ensuring the effective coupling and contact of the top face of the support plate and the bottom of the probe sleeve with the wall of the borehole.

According to the above-mentioned acoustic sensor for rock crack detection, in order to conveniently send the installation mechanism with the acoustic emission probe into the setting position inside the borehole, reduce the difficulty of manual operation and the abrasion of the cable or the probe installation mechanism caused by overlarge friction in the transmission process, each transmission mechanism includes transmission rods, connection rods and roller components. A connection screw hole is arranged at the center of one end of the transmission rod, a connection hole is arranged at the center of the other end, and a first fastening screw is arranged on the wall of the connection hole. The type and the size of the internal thread of the connection screw hole are the same as the type and size of the internal thread of the nut of each connection component. Each connection rod includes a thread section and a column section and is used for the connection between the transmission rod and the connection component and the connection between the transmission rods. The type and the size of the external thread of the thread section are matched with the type and the size of the internal thread of the connection screw hole arranged on each transmission rod, the shape and the size of the column section are matched with the shape and the size of the connection hole arranged on each transmission rod. When the column section of each connection rod is inserted into the connection hole of each transmission rod, the column section is fixed by the first fastening screw. Each roller component includes rollers, U-shaped installation plates, axles and roller sleeves, the number of the rollers is two or three, the number of the U-shaped installation plates and the number of the axles are equal to the number of the rollers. Each roller is respectively installed on the corresponding axle, both ends of each axle are respectively installed on two side plates of the corresponding U-shaped installation plate, so that each roller is respectively located between the two side plates of the corresponding U-shaped installation plate. An inner hole of the roller sleeve is larger than the outer diameter of each transmission rod and the wall of the roller sleeve is provided with a second fastening screw. Each U-shaped installation plate is respectively fixedly connected to the outer wall of the roller sleeve. When the number of the U-shaped installation plates is two, the included angle between center lines of the two U-shaped installation plates is 120-135 degrees. When the number of the U-shaped installation plates is three, center lines of two U-shaped installation plates are on a straight line, and included angles between a center line of the remaining U-shaped installation plate and the center lines of the two U-shaped installation plates are both 90 degrees. Each transmission rod is provided with at least one set of the roller component, and the roller sleeve of the roller component is sleeved on each transmission rod and is fixed by the second fastening screw.

According to the above-mentioned acoustic sensor for rock crack detection, in order to send the probe installation mechanism to a deeper borehole, multiple transmission rods can be used, two adjacent transmission rods are connected by the connection rod, and the transmission rods are fixedly connected to the connection rods by the first fastening screw. In the process of installation and disassembly, this connection method does not need to rotate two adjacent transmission rods, on one hand, friction between the probe installation mechanism and the borehole caused by the rotation of the transmission rods can be avoided, on the other hand, a mis-operation caused by winding between the rope connected to the limiting pin and the transmission rod due to rotation of the transmission rod can be avoided.

According to the above-mentioned acoustic sensor for rock crack detection, in order to conveniently fix the roller components, the transmission rods and the connection rods together, the first fastening screw and the second fastening screw can be the same fastening screw. When installing, the fastening screw hole of each transmission rod can be aligned with the fastening screw hole on each roller sleeve at first, and then the fastening screw is used to pass through the fastening screw holes of each transmission rod and each roller sleeve, and the fastening screw is propped against the column section of each connection rod, so that the roller components, the transmission rods and the connection rods are fixed together.

According to the above-mentioned acoustic sensor for rock crack detection, in order to draw forth the cable connecting to the acoustic emission probe conveniently, the notch arranged at the upper end of the wall of the probe sleeve and configured for the cable connector of the acoustic emission probe to protrude is a U-shaped notch, and the width of the U-shaped notch is larger than the diameter of the cable connector of the acoustic emission probe.

According to the above-mentioned acoustic sensor for rock crack detection, in order to further improve the signal transmission effect of the acoustic emission probe, a coupling agent can be coated on the lower end face of the acoustic emission probe in contact with the bottom of the probe sleeve, so that the bottom end face of the acoustic emission probe can effectively contact with the bottom of the probe sleeve. The coupling agent is butter, vaseline, etc.

According to the above-mentioned acoustic sensor for rock crack detection, the number of the probe installation mechanisms is equal to the number of the acoustic emission probes, and a plurality of the acoustic emission probes can be arranged in the same borehole along the axial direction of the borehole according to actual requirements. Orientations of different acoustic emission probes can be set according to actual monitoring requirements. Two adjacent acoustic emission sensors are connected by a transmission mechanism.

The working principle of the acoustic sensor for rock crack detection according to the present invention is as follows. The acoustic emission sensor locks the acoustic emission probe in the probe sleeve through a pluggable connection between the guide component and the sleeve component or the end cap, so that the overall size of the combination of the acoustic emission probe and the probe installation mechanism is smaller than the size of the borehole to be installed, so that the combination of the acoustic emission probe and the probe installation mechanism can move freely in the borehole. The guide component and the sleeve component or the limiting pin of the end cap are pulled out, and under the elastic action of the springs, the guide component and the sleeve component move in two opposite directions, so that the top face of the support plate of the guide component and the bottom of the probe sleeve of the sleeve component are in close contact with the inner wall of the borehole, respectively, thus ensuring the effective coupling between the acoustic emission probe and the wall of the borehole and satisfying the working condition of signal monitoring of the acoustic emission probe.

Compared with the prior art, the advantages of the present invention are as follows.

1. The acoustic sensor for rock crack detection of the present invention solves the problem of effective installation and coupling of the acoustic emission probe through the pluggable connection and cooperation between the guide component and the sleeve component or the end cap. After the acoustic emission probe is combined with the probe installation mechanism, the guide component is connected with the sleeve component or the end cap to lock the acoustic emission probe in the probe sleeve of the sleeve component, so that make the springs inside the spring sleeves of the sleeve component in a compressed state. The overall size of the combination of the acoustic emission probe and the probe installation mechanism is smaller than the size of the borehole, thus facilitating the transmission of the combination of the acoustic emission probe and the probe installation mechanism in the borehole of the monitored rock mass. When the combination of the acoustic emission probe and the probe installation mechanism is transmitted to a setting position, the connection between the guide component and the sleeve component or the end cap is cancelled and the pressure on the springs is eliminated. The top face of the support plate of the guide component and the bottom of the probe sleeve are in close contact with the wall of the borehole under the action of the elastic restoring force of the springs, thus ensuring the effective coupling between the acoustic emission probe and the wall of the borehole.

2. According to the acoustic sensor for rock crack detection of the present invention, the top face of the support plate constituting the probe installation mechanism and the bottom of the probe sleeve are arc-shaped coupling faces matched with the wall of the borehole, ensuring the coupling effect between the acoustic emission probe and the wall of the borehole, and enhancing the monitoring and forecasting reliability of the mine rock (rock mass) stability and the rock crack dynamic disaster.

3. According to the acoustic sensor for rock crack detection of the present invention, the size of the probe installation mechanism used by the acoustic emission sensor in the transmission process is smaller than the size of the borehole, and the transmission rod of the transmission mechanism can be formed by connecting a plurality of transmission rods, so that the system is not only convenient to install, but also not affected by the depth and orientation of the borehole, having wider application range.

4. According to the acoustic sensor for rock crack detection of the present invention, each of the transmission mechanisms used by the acoustic emission sensor is designed with a transmission roller to realize the rolling transmission in the installation process, thereby overcoming the effect of the frictional force of the wall of the borehole in the process of installation and transmission, and ensuring the integrity of the acoustic emission sensor and a transmission cable.

5. According to the acoustic sensor for rock crack detection of the present invention, the connection brackets fixedly connected to the probe sleeve are rotatably connected to the nuts, making the probe sleeve achieve small rotation within a certain range with respect to the transmission rod, thus not only facilitating the transmission of the acoustic emission sensor, but also facilitating the installation and adjustment of the acoustic emission sensor, and further ensuring the effective coupling contact of the top face of the support plate and the bottom of the probe sleeve with the wall of the borehole.

6. According to the acoustic sensor for rock crack detection of the present invention, the acoustic emission sensor has the features of simple structure and convenient installation and disassembly, thereby reducing the labor intensity and saving a lot of labor costs.

7. According to the acoustic sensor for rock crack detection of the present invention, in order to meet different requirements, a plurality of probe installation mechanisms can be connected through a plurality of transmission components to realize the purpose of arranging a plurality of acoustic emission probes in the same borehole, so that the end face of each acoustic emission probe can be respectively determined according to the monitoring requirements, thereby improving the monitoring efficiency of the engineering stability of the rock (rock mass) and the rock crack dynamic disaster.

In the drawings: 1, sleeve component, 1-1, probe sleeve, 1-2, spring sleeve, 1-3, first pin hole, 1-4, notch, 2, guide component, 2-1, support plate, 2-1-1, center hole, 2-1-2, third pin hole, 2-2, guide rod, 2-3, second pin hole, 2-4, shaft shoulder, 3, acoustic emission probe, 3-1, cable connector, 4, end cap, 4-1, cover plate, 4-2, connection piece, 4-3, via hole, 5, spring, 6, limiting pin, 7, rope, 8, connection bracket, 9, nut, 10, transmission rod, 10-1, connection hole, 10-2, connection screw hole, 10-3, first fastening screw, 11, roller component, 11-1, roller, 11-2, U-shaped installation plate, 11-3, axle, 11-4, roller sleeve, 11-5, second fastening screw, 12, connection rod, 12-1, thread section, 12-2, column section.

DETAILED DESCRIPTION

Hereinafter, the acoustic sensor for rock crack detection of the present invention will be described clearly and completely through the embodiments with reference to the drawings. Apparently, the described embodiments are merely some of the embodiments of the present invention rather than all. Any other embodiment obtained by those skilled in the art without creative effort based on the embodiments of the present invention shall fall within the protection scope of the present invention.

Embodiment 1

Figure 1:
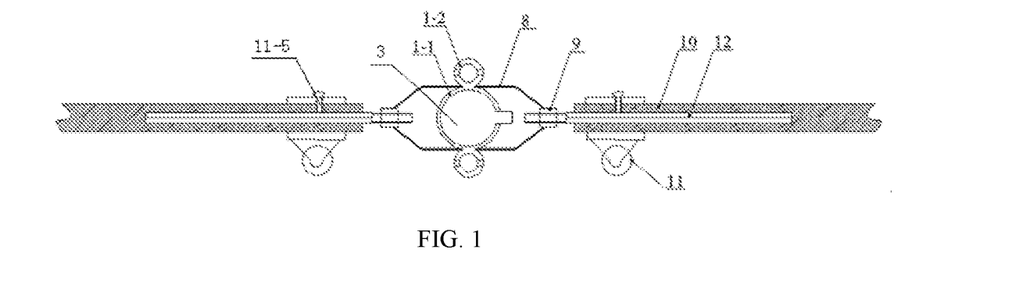
FIG. 1 is a structural schematic view of the acoustic sensor for rock crack detection according to the present invention.

As shown in FIG. 1, the acoustic sensor for rock crack detection provided by the present invention includes an acoustic emission probe 3, a probe installation mechanism and a transmission mechanism for transmitting the combination of the probe installation mechanism and the acoustic emission probe to a setting position inside a borehole in the monitored rock mass. The number of the probe installation mechanisms and the number of the acoustic emission probes are both one.

Figure 4:
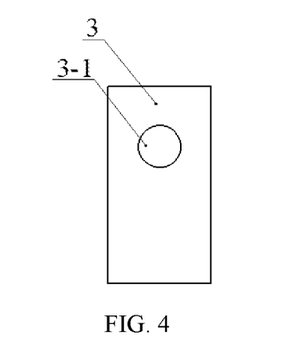
FIG. 4 is a schematic view of the acoustic emission probe.
Figure 5:
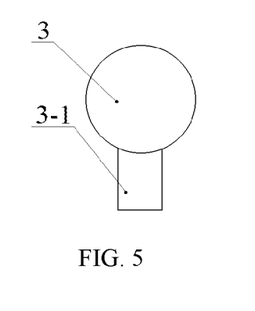
FIG. 5 is a top view of FIG. 4.

As shown in FIG. 4 and FIG. 5, the above-mentioned acoustic emission probe 3 has a cylindrical structure with cable connector 3-1 protruding from the side. One end face of acoustic emission probe 3 is coated with butter.

Figure 2:
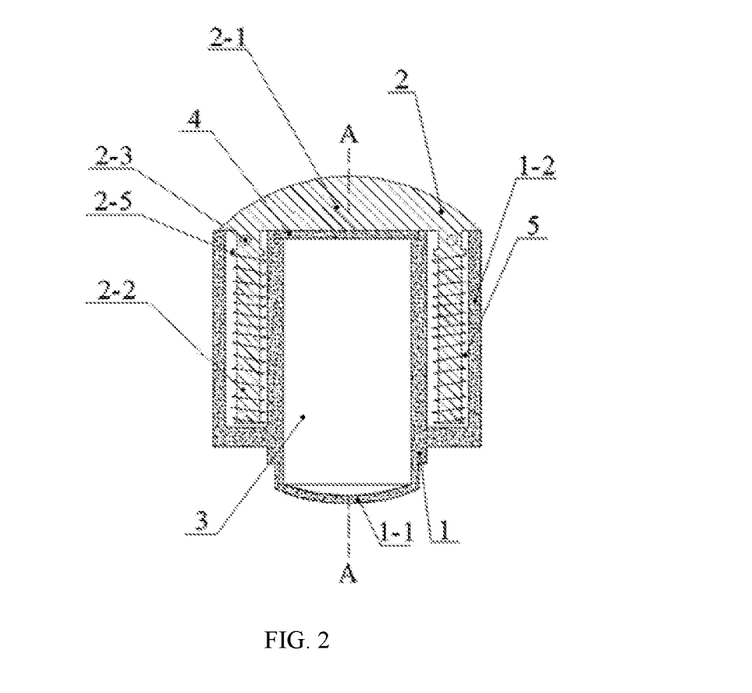
FIG. 2 is a schematic view showing a combination of the acoustic emission probe and the sleeve component, the guide component, the end cap, the springs and the limiting pin of the probe installation mechanism.
Figure 3:
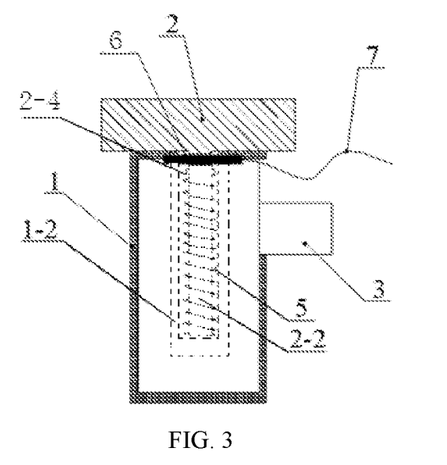
FIG. 3 is a sectional view of A-A in FIG. 2.

As shown in FIGS. 1-3, the above-mentioned probe installation mechanism includes sleeve component 1, guide component 2, end cap 4, springs 5, limiting pin 6 and the connection component.

Figure 6:
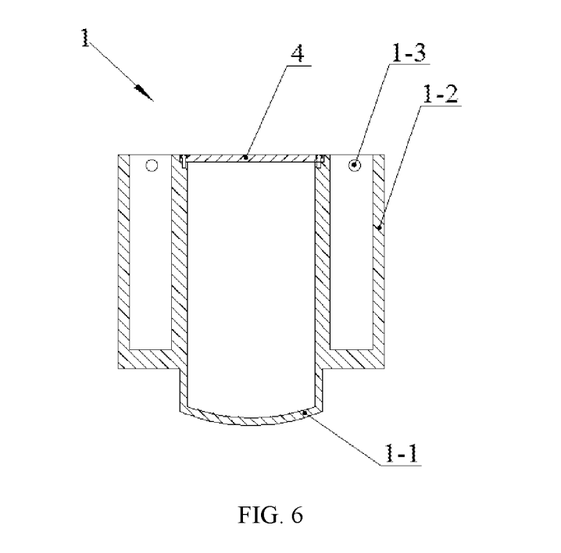
FIG. 6 is a structural schematic view of the sleeve component in the emission probe installation mechanism.

As shown in FIGS. 2, 3 and 6, sleeve component 1 includes probe sleeve 1-1 and spring sleeves 1-2. The probe sleeve 1-1 is a cylinder with a closed lower end and an open upper end. The inner hole of the probe sleeve is in clearance fit with acoustic emission probe 3. The lower end face of the probe sleeve is an arc face matched with the radian of the borehole of the monitored rock mass. The upper end of the wall of the probe sleeve is provided with a U-shaped notch 1-4 for the cable connector of the acoustic emission probe to protrude. Spring sleeve 1-2 is a cylinder with a closed lower end and an open upper end. The number of the spring sleeves is two. The two spring sleeves are axially symmetrically welded and fixedly connected to the outer wall of the probe sleeve with respect to the center line of the probe sleeve. A line between projections of center lines of the two spring sleeves in a horizontal plane is perpendicular to projections of center lines of the notches 1-4 on the horizontal plane. The upper end of each of the two spring sleeves is provided with first pin hole 1-3 for limiting pin 6 to pass through.

As shown in FIG. 6, end cap 4 is a plate-like body matched with the shape and size of the upper end face of probe sleeve 1-1.

Figure 7:
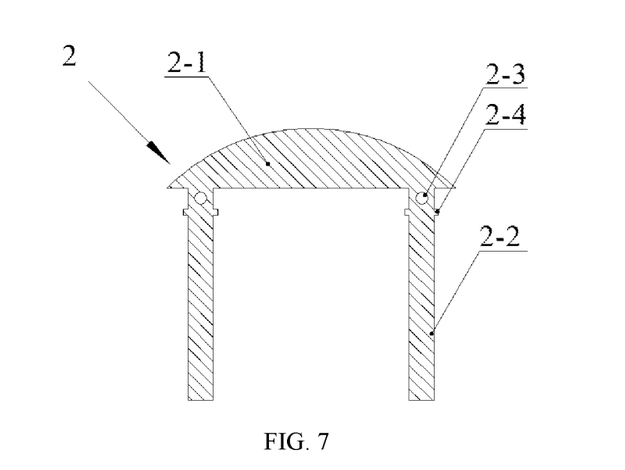
FIG. 7 is a structural schematic view of the guide component in the emission probe installation mechanism.

As shown in FIGS. 2, 3 and 7, guide component 2 includes support plate 2-1 and two guide rods 2-2 with shaft shoulders 2-4 in the upper sections thereof. Support plate 2-1 has a cylindrical structure with an arc top face matched with the radian of the borehole of the monitored rock mass and a planar bottom face. The upper sections of the shaft shoulders on two guide rods 2-2 are provided with second pin hole 2-3 for limiting pin 6 to pass through. The two guide rods are axially symmetrical and fixed to the bottom face of the support plate with respect to the center line of the support plate, and the spacing between the center lines of the two guide rods is equal to the spacing between the center lines of two spring sleeves 1-2.

Limiting pin 6 is tied with rope 7 that controls the pull-out of the limiting pin to facilitate the operation thereof. The other end of rope 7 protrudes from the borehole. The rope used in this embodiment is a wire rope.

Figure 8:
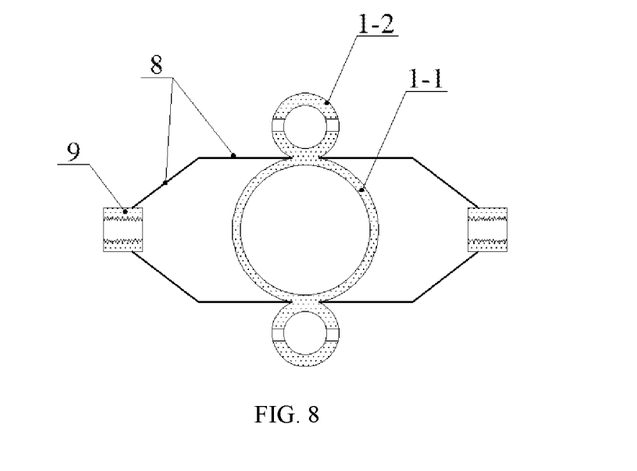
FIG. 8 is a schematic view showing a combination of the sleeve component and the connection component in the emission probe installation mechanism.
Figure 9:
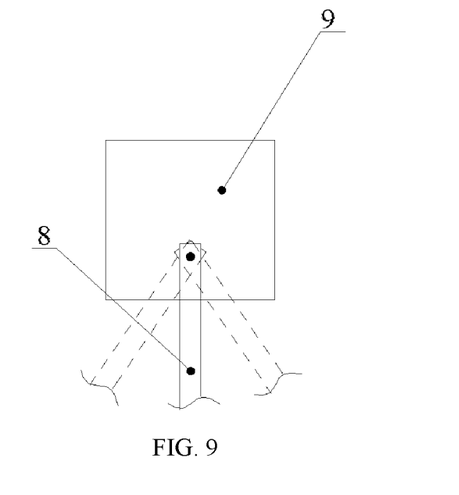
FIG. 9 is a schematic view showing the connection mode of the connection brackets and the nut of the probe component in the probe installation mechanism.

As shown in FIG. 1 and FIG. 8, two sets of the above-mentioned connection components are included and are symmetrically distributed with respect to the center line of probe sleeve 1-1. Each connection component includes nut 9 and two pairs of connection brackets 8. The number of the connection brackets in each pair are two. Connection bracket 8 can be bent according to the size relationship between probe sleeve 1-1 and nut 9. One end of each connection bracket 8 is welded between the probe sleeve 1-1 and the spring sleeve 1-2, and the other end is hinged to the outer wall of nut 9 through rivets. Through the connection components, the transmission mechanisms can be respectively installed symmetrically with respect to the center line of probe sleeve 1-1, which not only facilitates the transmission of the acoustic emission sensor in the borehole, but also connects a plurality of probe installation mechanisms through the transmission rods to realize the purpose of arranging a plurality of acoustic emission probes in the same borehole.

Figure 10:
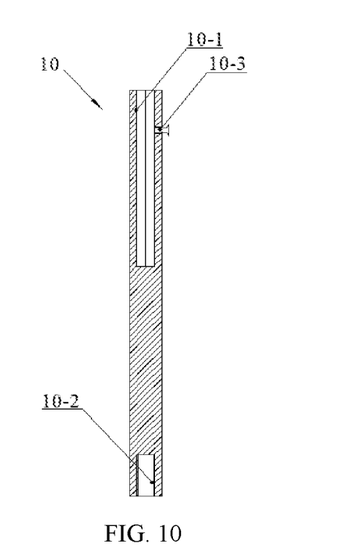
FIG. 10 is a structural schematic view of the transmission rod in the transmission mechanism.
Figure 11:
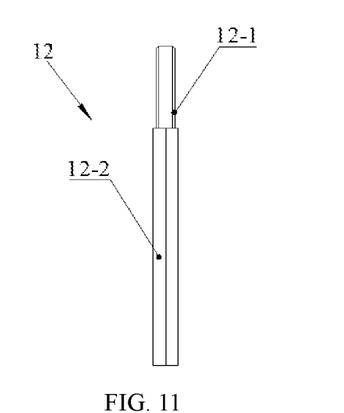
FIG. 11 is a structural schematic view of the connection rod in the transmission mechanism.
Figure 12:
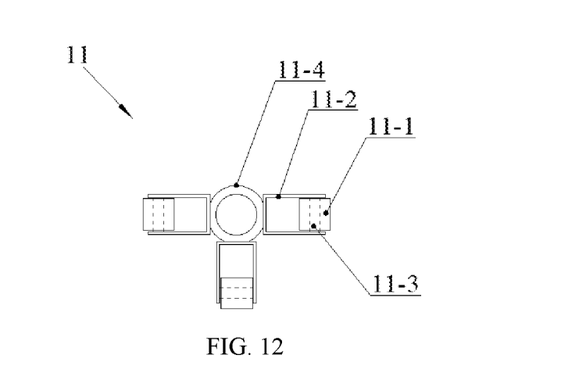
FIG. 12 is a structural schematic view of the roller component in the transmission mechanism.

As shown in FIGS. 1, 10 and 12, each above-mentioned transmission mechanism is formed by the combination of transmission rods 10, connection rods 12 and roller components 11. The center of one end of each transmission rod 10 is provided with a connection screw hole 10-2, the center of the other end is provided with connection hole 10-1 and the wall of each connection hole is provided with first fastening screw 10-3. The type and the size of the internal thread of the connection screw hole are the same as the type and the size of the internal thread of nut 9 in each connection component. Connection rod 12 includes thread section 12-1 and column section 12-2 for the connection between the transmission rods and the connection components and the connection between the transmission rods. The type and the size of the external thread of thread section 12-1 are matched with the type and the size of the internal thread of each connection screw hole 10-2 arranged on each transmission rod, and the shape and the size of column section 12-2 are matched with the shape and the size of connection hole 10-1 arranged on each transmission rod. When column section 12-2 of each connection rod is inserted into connection hole 7-1 of each transmission rod, the column section of the connection rod and the connection hole is fixed by first fastening screw. Each roller component 11 includes rollers 11-1, U-shaped installation plates 11-2, axles 11-3 and roller sleeve 11-4, the number of rollers 11-1 is three, the number of U-shaped installation plates 11-2 and the number of axles 11-3 are the same as the number of the rollers. Each roller 11-1 is respectively installed on the corresponding axle, both ends of each axle 11-3 are respectively installed on two side plates of corresponding U-shaped installation plate 11-2, so that each roller is respectively located between the side plates of the corresponding U-shaped installation plate, the inner hole of roller sleeve 11-4 is larger than the outer diameter of each transmission rod 10 and the wall of each roller sleeve 11-4 is provided with second fastening screw 11-5, each U-shaped installation plate is respectively fixedly connected to the outer wall of roller sleeve 11-4. Center lines of two U-shaped installation plates are on a straight line, and included angles between a center line of the remaining U-shaped installation plate and the center lines of the two U-shaped installation plates are 90 degrees. Each transmission rod 10 is provided with a set of roller component 11, and roller sleeve 11-4 of the roller component is sleeved on transmission rod 10 and fixed by the second fastening screw 11-5.

As shown in FIGS. 1-3, the assembly method of the acoustic sensor for rock crack detection is as follows. Acoustic emission probe 3 is installed inside probe sleeve 1-1. One end of acoustic emission probe 3 coated with butter is in contact with the bottom of the probe sleeve, and cable connector 3-1 thereof protrudes from U-shaped notch 1-4 arranged on the wall of the probe sleeve. Two springs 5 are respectively arranged in the two spring sleeves 1-2, and the lower ends of the two springs 5 are respectively in contact with the bottom wall of the spring sleeves. The end cap covers the upper end face of probe sleeve 1-1 and is fixed on the probe sleeve by the screw. Two guide rods 2-2 of the guide component are respectively combined with the two springs 5. The lower annular faces of the shaft shoulders of the guide rods are respectively in contact with the upper ends of the two springs. Two limiting pins 6 are respectively inserted into first pin holes 1-3 arranged on the two spring sleeves and second pin holes 2-3 arranged on the two guide rods to connect the spring sleeve with the guide rod, so as to make two springs 5 in a compressed state and complete the assembly of the acoustic emission probe and the probe installation mechanism. After that, column sections 12-2 of the connection rods are inserted into connection holes 10-1 of the transmission rods and fixed by first fastening screws 10-3, then the roller sleeve 11-4 of each roller component is sleeved on the transmission rods 10 and fixed by the second fastening screw 11-5, and thread section 12-1 of each connection rod is combined with nut 9, thus realizing the connection between the probe installation mechanism and the transmission mechanism and completing the assembly of the acoustic sensor for rock crack detection.

Figure 13:
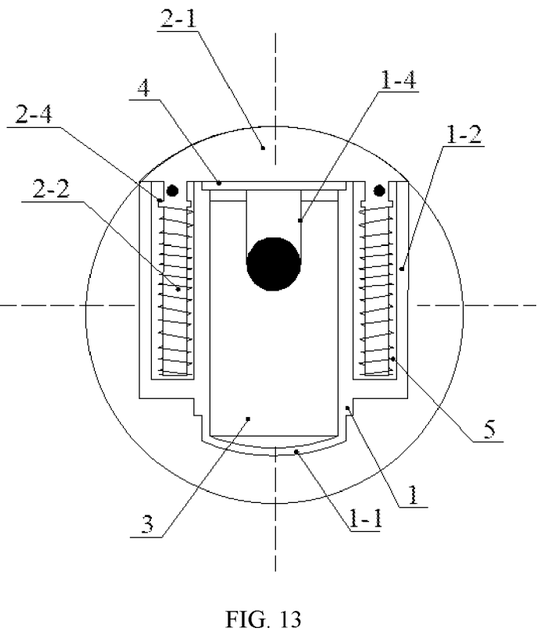
FIG. 13 is a schematic view showing the combination of the acoustic emission probe and the probe installation mechanism in an installation state.
Figure 14:
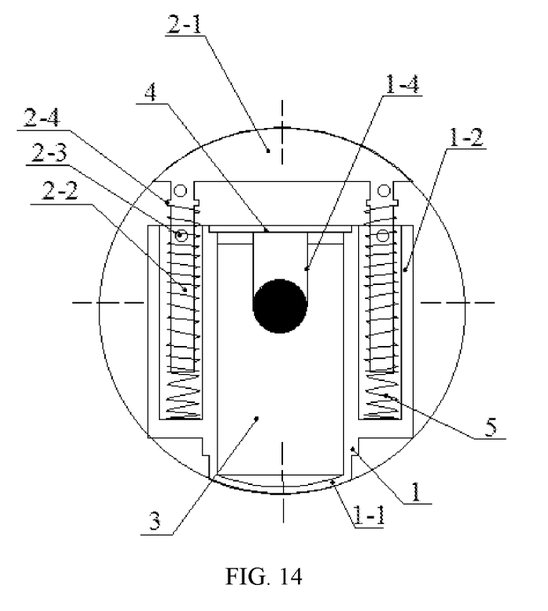
FIG. 14 is a schematic view showing the combination of the acoustic emission probe and the probe installation mechanism in a monitoring state.

As shown in FIGS. 1, 13, and 14, the process of using the acoustic sensor for rock crack detection is as follows. The combination of acoustic emission probe and probe installation mechanism is put into the borehole, transmission rod 10 is pushed, the combination of acoustic emission probe and probe installation mechanism is transmitted to a position to be monitored, rope 7 is pulled, and then limiting pin 6 inserted into first pin hole 1-3 and second pin hole 2-3 is pulled out. Under the elastic restoring force of springs 5, sleeve component 1 and guide component 2 move in opposite directions, making the top face of support plate 2-1 and the bottom end of probe sleeve 1-1 are in close contact with the wall of the borehole, respectively. Since the top face of support plate 2-1 and the bottom end of the probe sleeve 1-1 are both arc faces matched with the wall profile of the borehole, the effective contact between the acoustic emission probe and the wall of the borehole can be ensured, and the validity and stability of the signals received by the acoustic emission probe can be ensured. In addition, connection brackets 8 and nuts 9 are in rotary connection, which enables the probe installation mechanism to realize small rotation during the installation process and ensures that the top face of support plate 2-1 and the bottom end of probe sleeve 1-1 are in effective contact with the wall of the borehole.

Additionally, a plurality of transmission rods 10 can be connected in sequence through connection rods 12 to meet the requirement of the depth of the borehole, so that the acoustic sensor for rock crack detection is not affected by the borehole depth and orientation of mine rocks (rock mass) and the application range thereof is widened.

The welding fixed connection method in this embodiment can also be replaced by other fixed connection methods such as bolt fixed connection method and integrated molding. The screw fixed connection method can also be replaced by other detachable fixed connection methods such as snap-fit, magnetic connector, etc.

Embodiment 2

The acoustic sensor for rock crack detection provided by this embodiment includes an acoustic emission probe, a probe installation mechanism and a transmission mechanism for transmitting the combination of the probe installation mechanism and the acoustic emission probe to a setting position inside a borehole in the monitored rock mass. Both the number of the probe installation mechanisms and the number of the acoustic emission probes are one.

The transmission mechanism provided in this embodiment is the same as that given in embodiment 1.

Figure 15:
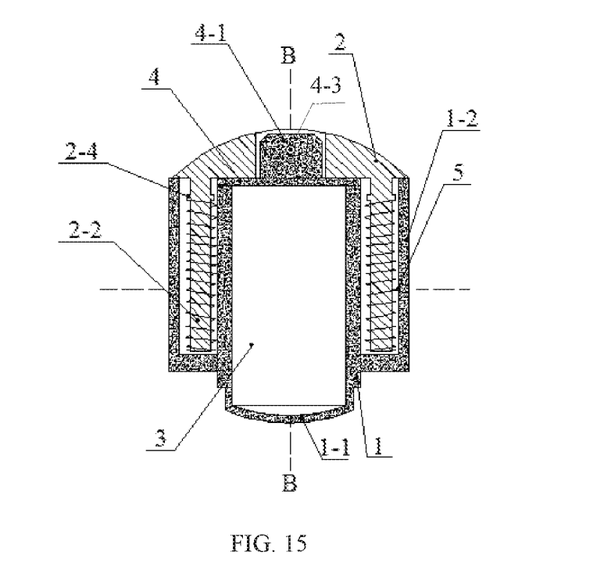
FIG. 15 is a schematic view showing another combination of the acoustic emission probe and the sleeve component, the guide component, the end cap, the springs and the limiting pin of the probe installation mechanism.
Figure 16:
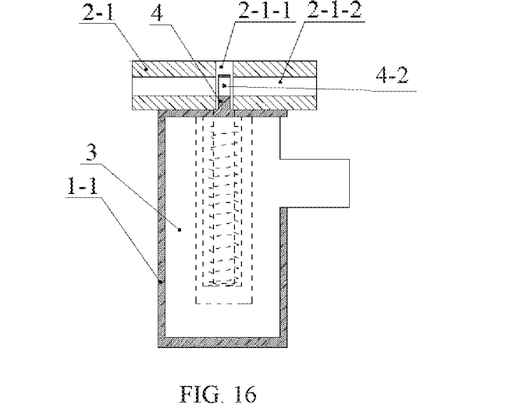
FIG. 16 is a sectional view of B-B in FIG. 15.
Figure 17:
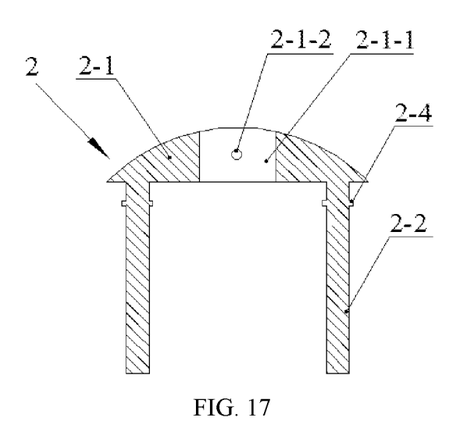
FIG. 17 is another structural schematic view of the guide component in the emission probe installation mechanism.

The probe installation mechanism provided in this embodiment is substantially the same as the probe installation mechanism given in embodiment 1. In view of the fact that the moving direction of guide component 2 and sleeve component 1 is controlled through the pluggable connection between guide component 2 and end cap 4 in this embodiment, certain improvements to the structures of sleeve component 1, guide component 2, and end cap 4 are made in this embodiment, as shown in FIGS. 15-17. End cap 4 includes cover plate 4-1 and connection piece 4-2 arranged on the top face of the cover plate, the shape and size of cover plate 4-1 are matched with the shape and size of the upper end face of probe sleeve 1-1. Connection piece 4-2 is provided with via hole 4-3 for limiting pins 6 to pass through. Support plate 2-1 of the guide component has a structure with an arc top face matched with the radian of the borehole of the monitored rock mass and a planar bottom face, and the central part of support plate 2-1 is provided with center hole 2-1-1 matched with the shape and size of connection piece 4-2 of the end cap. The wall of the center hole is provided with third pin hole 2-1-2 for the limiting pins to pass through, and the upper sections of the shaft shoulders on two guide rods 2-2 and the upper ends of two spring sleeves 1-2 are not provided with pin holes any more. The two guide rods are axially symmetrically fixed on the bottom face of the support plate with respect to a center line of the support plate, and the spacing between the center lines of the two guide rods is equal to the spacing between the center lines of two spring sleeves 1-2.

The assembly method of the acoustic sensor for rock crack detection is as follows. Acoustic emission probe 3 is installed inside probe sleeve 1-1. One end of acoustic emission probe 3 coated with butter is in contact with the bottom of the probe sleeve, and cable connector 3-1 thereof protrudes from U-shaped notch 1-4 arranged on the wall of the probe sleeve. Two springs 5 are respectively arranged in the two spring sleeves 1-2, and the lower ends of the two springs 5 are respectively in contact with the bottom walls of the spring sleeves. Cover plate 4-1 of the end cap covers the upper end face of probe sleeve 1-1 and is fixed on the probe sleeve by the screw. Support plate 2-1 of the guide component is sleeved on connection piece 4-2 of the end cap, the bottom of support plate 4 is in contact with the cover plate of end cap 4. The limiting pin 6 is inserted into third pin hole 2-1-2 arranged on the support plate and via hole 4-3 arranged on the connection piece of the end cap to connect the support plate with the end cap, so as to make two springs 5 in a compressed state and complete the assembly of the acoustic emission probe and the probe installation mechanism. After that, column sections 12-2 of the connection rods are inserted into connection holes 10-1 of the transmission rods and fixed by first fastening screws 10-3, then the roller sleeve 11-4 of each roller component is sleeved on the transmission rod 10 and fixed by the second fastening screw 11-5, and thread section 12-1 of each connection rod is combined with nut 9, thus realizing the connection between the probe installation mechanism and the transmission mechanism and completing the assembly of the acoustic sensor for rock crack detection.

The process of using the acoustic sensor for rock crack detection provided in this embodiment is the same as that of embodiment 1.

The invention claimed is:

1. An acoustic sensor for rock crack detection, comprising:
an acoustic emission probe, wherein
the acoustic sensor further comprises a probe installation mechanism and a transmission mechanism for transmitting a combination of the probe installation mechanism and the acoustic emission probe to a setting position inside a borehole in a monitored rock mass,
a number of the acoustic emission probes is at least one, and
a number of the probe installation mechanisms is equal to the number of the acoustic emission probes;
the probe installation mechanism comprises a sleeve component, a guide component, an end cap, springs, a limiting pin and a connection component;
the sleeve component comprises a probe sleeve and spring sleeves;
the probe sleeve is a first cylinder with a first closed lower end and a first open upper end;
an inner hole of the probe sleeve is in clearance fit with the acoustic emission probe;
a lower end face of the probe sleeve is an arc face matched with a radian of the borehole of the monitored rock mass,
an upper end of a wall of the probe sleeve is provided with one or two notches for a cable connector of the acoustic emission probe to protrude;
if a number of the notches is two, the two notches are axially symmetrically distributed with respect to a center line of the probe sleeve;
each of the spring sleeves is a second cylinder with a second closed lower end and a second open upper end,
a number of the spring sleeves is two, the two spring sleeves are axially symmetrically fixed on an outer wall of the probe sleeve with respect to the center line of the probe sleeve,
a line between projections of center lines of the two spring sleeves on a horizontal plane is perpendicular to projections of center lines of the notches on the horizontal plane;
the end cap is a plate-like body matched with a shape and a size of an upper end face of the probe sleeve, or the end cap comprises a cover plate and a connection piece arranged on a top face of the cover plate;
the cover plate is matched with the shape and the size of the upper end face of the probe sleeve, the connection piece is provided with a via hole for the limiting pin to pass through;
the guide component comprises a support plate and two guide rods with shaft shoulders on upper sections of the guide rods;
if the end cap is the plate-like body, the support plate has a structure with an arc top face matched with the radian of the borehole of the monitored rock mass and a planar bottom face, upper sections of the shaft shoulders on the two guide rods are provided with second pin holes, and upper ends of the two spring sleeves are provided with first pin holes;
if the end cap comprises the cover plate and the connection piece arranged on the top face of the cover plate, the support plate has the structure with the arc top face matched with the radian of the borehole of the monitored rock mass and the planar bottom face, and a central part of the support plate is provided with a center hole matched with a shape and a size of the connection piece of the end cap, a wall of the center hole is provided with a third pin hole, the upper sections of the shaft shoulders on the two guide rods and the upper ends of the two spring sleeves are not provided with pin holes anymore; the two guide rods are axial symmetrically fixed on a bottom face of the support plate with respect to a center line of the support plate, and a spacing between center lines of the two guide rods is equal to a spacing between the center lines of the two spring sleeves;
the connection components are two sets, axial symmetrically installed on the outer wall of the probe sleeve with respect to the center line of the probe sleeve, projections of center lines of the two connection components on the horizontal plane are perpendicular to the line between projections of center lines of the two spring sleeves on the horizontal plane;
the acoustic emission probe is installed inside the probe sleeve,
the cable connector protrudes from the notch arranged on a wall of the probe sleeve;
a number of the springs is two, the two springs are respectively arranged in the two spring sleeves;
a lower end of each of the two springs is in contact with a bottom wall of each of the spring sleeve,
if the end cap is the plate-like body, the end cap covers the upper end face of the probe sleeve and is detachably connected to the probe sleeve; the two guide rods of the guide component are respectively combined with the two springs, a lower annular face of each of the shaft shoulders of the guide rods is respectively in contact with the upper end of each of the two springs, a number of limiting pins is two, the two limiting pins are respectively connected to ropes and respectively inserted into the first pin holes arranged on the two spring sleeves and the second pin holes arranged on the two guide rods to connect the spring sleeves with the guide rods, so as to make the two springs in a compressed state;

if the end cap comprises the cover plate and the connection piece arranged on the top face of the cover plate, the cover plate of the end cap covers the upper end face of the probe sleeve and is detachably connected to the probe sleeve, the support plate of the guide component is sleeved on the connection piece of the end cap, and the bottom face of the support plate is in contact with the cover plate of the end cap, the number of limiting pins is one, the limiting pin is connected to the rope and inserted into the third pin hole arranged on the support plate and the via hole arranged on the connection piece of the end cap to connect the support plate with the end cap, so as to make the two springs in a compressed state; and the transmission mechanisms are connected to the connection components installed on the probe sleeve.

2. The acoustic sensor for rock crack detection according to claim 1, wherein the connection component comprises a nut and at least two pairs of connection brackets, a first end of each of the connection brackets is uniformly distributed around an outer wall of the nut and hinged with the outer wall of the nut, and a second end of each of the connection brackets is fixedly connected to an outer wall of the probe sleeve.

3. The acoustic sensor for rock crack detection according to claim 2, wherein the transmission mechanism comprises transmission rods, connection rods, and roller components;

a connection screw hole is arranged at a central part of a first end of each of the transmission rods, a connection hole is arranged at a central part of a second end of each of the transmission rods, a first fastening screw is arranged on a wall of the connection hole;

a type and a size of an internal thread of the connection screw hole are the same as a type and a size of an internal thread of the nut of the connection component;

each of the connection rods comprises a thread section and a column section, and is used for a connection between the transmission rod and the connection component and a connection between the transmission rods;

a type and a size of an external thread of the thread section are matched with the type and size of the internal thread of the connection screw hole arranged on each of the transmission rods, a shape and a size of the column section are matched with a shape and a size of the connection hole arranged on each of the transmission rods;

when the column section of each of the connection rods is inserted into the connection hole of each of the transmission rods, the column section of the connection rod and the connection hole are fixed by the first fastening screw;

each of the roller components comprises rollers, U-shaped installation plates, axles and a roller sleeve, a number of the rollers is two or three, a number of the U-shaped installation plates and a number of the axles are equal to the number of the rollers;

each of the rollers is respectively installed on the corresponding axle, both ends of each axle are respectively installed on two side plates of the corresponding U-shaped installation plates, so that each of the rollers is respectively located between the two side plates of the corresponding U-shaped installation plate, an inner hole of the roller sleeve is larger than an outer diameter of each of the transmission rods;

a wall of the roller sleeve is provided with a second fastening screw, each of the U-shaped installation plates is respectively fixedly connected to an outer wall of the roller sleeve, when the number of the U-shaped installation plates is two, an included angle between center lines of the two U-shaped installation plates is 120-135 degrees, when the number of the U-shaped installation plates is three, the center lines of two U-shaped installation plates are on a straight line, included angles between a center line of the remaining U-shaped installation plates and the center lines of the two U-shaped installation plates are 90 degrees;

each of the transmission rods is provided with at least one set of the roller component, and the roller sleeve of the roller component is sleeved on the transmission rod and fixed by the second fastening screw.

4. The acoustic sensor for rock crack detection according to claim 1, wherein the notch arranged at the upper end of the wall of probe sleeve and configured for the cable connector of the acoustic emission probe to protrude is a U-shaped notch.

5. The acoustic sensor for rock crack detection according to claim 1, wherein a lower end face of the acoustic emission probe contacting with a bottom of the probe sleeve is coated with a coupling agent.

6. The acoustic sensor for rock crack detection according to claim 4, wherein a lower end face of the acoustic emission probe contacting with a bottom of the probe sleeve is coated with a coupling agent.

7. The acoustic sensor for rock crack detection according to claim 2, wherein the notch arranged at the upper end of the wall of probe sleeve and configured for the cable connector of the acoustic emission probe to protrude is a U-shaped notch.

8. The acoustic sensor for rock crack detection according to claim 3, wherein the notch arranged at the upper end of the wall of probe sleeve and configured for the cable connector of the acoustic emission probe to protrude is a U-shaped notch.

9. The acoustic sensor for rock crack detection according to claim 2, wherein a lower end face of the acoustic emission probe contacting with a bottom of the probe sleeve is coated with a coupling agent.

10. The acoustic sensor for rock crack detection according to claim 3, wherein a lower end face of the acoustic emission probe contacting with a bottom of the probe sleeve is coated with a coupling agent.

11. The acoustic sensor for rock crack detection according to claim 7, wherein a lower end face of the acoustic emission probe contacting with a bottom of the probe sleeve is coated with a coupling agent.

12. The acoustic sensor for rock crack detection according to claim 8, wherein a lower end face of the acoustic emission probe contacting with a bottom of the probe sleeve is coated with a coupling agent.

* * * * *